United States Patent

Rappolt

Patent Number: 5,850,728
Date of Patent: Dec. 22, 1998

[54] WHEELED DEVICE FOR HAND HELD BRUSH CUTTER

[76] Inventor: Peter L. Rappolt, 97 Woorarra Avenue, Elanora Heights, NSW. 2101, Australia

[21] Appl. No.: 704,709
[22] PCT Filed: Mar. 15, 1995
[86] PCT No.: PCT/AU95/00136
§ 371 Date: Sep. 13, 1996
§ 102(e) Date: Sep. 13, 1996
[87] PCT Pub. No.: WO95/24824
PCT Pub. Date: Sep. 21, 1995

[30] Foreign Application Priority Data

Mar. 15, 1994 [AU] Australia .................................. PM4436
Oct. 12, 1994 [AU] Australia .............................. 75758194

[51] Int. Cl.⁶ .......................... A01D 34/68; A01D 34/82
[52] U.S. Cl. ........................................ 56/17.1; 56/DIG. 12
[58] Field of Search ....................................... 56/12.1, 12.7, 56/16.7, 17.1, DIG. 12, DIG. 13

[56] References Cited

U.S. PATENT DOCUMENTS

| | | | |
|---|---|---|---|
| 4,182,100 | 1/1980 | Letter | 56/16.7 |
| 4,411,126 | 10/1983 | Lowry et al. | |
| 4,442,659 | 4/1984 | Enbusk | 56/12.7 |
| 4,512,143 | 4/1985 | Jimenez | 56/16.7 |
| 4,531,350 | 7/1985 | Huthmacher . | |
| 4,688,376 | 8/1987 | Wolfe, Sr. . | |
| 4,704,849 | 11/1987 | Gilbert et al. . | |
| 4,756,147 | 7/1988 | Savell | 56/16.7 |
| 4,796,415 | 1/1989 | Moore . | |
| 4,922,694 | 5/1990 | Emoto | 56/16.7 |
| 4,936,886 | 6/1990 | Quillen | 56/16.7 |
| 5,045,615 | 9/1991 | Feldmann | 56/16.7 X |
| 5,092,112 | 3/1992 | Buckendorf, Jr. . | |
| 5,233,818 | 8/1993 | Dettbarn | 56/16.7 X |
| 5,287,683 | 2/1994 | Smith | 56/16.7 X |

FOREIGN PATENT DOCUMENTS

| | | |
|---|---|---|
| 16644/76 | 10/1979 | Australia . |
| 47346/79 | 11/1979 | Australia . |
| 66524/81 | 8/1981 | Australia . |
| 78500/81 | 7/1982 | Australia . |
| 70542/81 | 11/1982 | Australia . |
| 43442/85 | 12/1985 | Australia . |
| 52714/93 | 7/1994 | Australia . |

Primary Examiner—Christopher J. Novosad
Attorney, Agent, or Firm—Welsh & Katz, Ltd.

[57] ABSTRACT

A wheeled device for use with a brush cutter, comprising: a frame; a plurality of wheels mounted on the frame to support the frame for movement over the ground; a mounting on the frame for attaching a brush cutter to the frame with a blade of a brush cutter substantially parallel to the ground. The mounting, adapted to attach to the boom of the brush cutter, is adjustable to move the center of the blade relative to the frame to accommodate different size blades and may also be adjustable to accommodate different brush cutter having different angles of boom. The mounting of the wheels may be such as to allow the separation of at least one of the wheels from at least one of the remaining wheels to be adjustable.

9 Claims, 7 Drawing Sheets

WHEELED DEVICE FOR HAND HELD BRUSH CUTTER

This invention relates to hand held brush cutters and more particularly to a device to enable a hand held brush cutter to be used as a lawn mower.

Brush cutters are generally of a type having an electric or internal combustion engine driving a cutting "blade". For ease of use the motor is usually mounted at one end of a hollow rod (the boom) and the blade at the other. A flexible shaft mounted within the boom enables the motor to drive the blade. The boom is usually angled near the blade so the blade may be held roughly parallel to the ground whilst the reminder of the boom is at about 45° to the ground. The blade usually comprises one or two strands of a flexible polymer. In use the strands wear and the device automatically plays out more line. While flexible line type blades are popular due to their safety, conventional rigid metal bladed models are available.

In the following description and claims, the term "blade" is to be understood to include both types of cutting device.

Brush cutters are intended for use in cutting vegetation where a conventional lawn mower cannot cut, such as against a fence line, around trees or against a walled garden. While they can be used to cut large expanses of grass, it is not practical. This is because the blade cannot be held at a constant height and angle relative to the ground, resulting in an uneven height of grass. Furthermore, if the blade is angled so as to hit the ground, it will tend to cut a groove, resulting in an unsightly appearance.

In an attempt to allow a brush cutter to be used successfully as a lawn mower, the invention, in one broad form, provides an attachment for use with a brush cutter having a boom, the attachment comprising:
  a frame having a front end and a rear end and two side members joined at the front end and diverging toward the rear end;
  three wheels mounted on the frame to support the frame for movement over the ground, the wheels comprising a front wheel mounted at or adjacent the front end and two spaced apart rear wheels mounted at or adjacent the rear end;
  a mounting for attaching a brush cutter to the frame with the blade of the brush cutter substantially parallel to the ground, the mounting adapted to firmly and rigidly grip the boom of the brush cutter and to locate the centre of the blade within an area bounded by the wheels;
  the side members comprising the sideways limit of the frame and extending generally parallel to a line joining the front wheel to the respective rear wheel so as to allow a blade of sufficient size to extend sideways of the frame whilst clearing the wheels.

The device is preferably sized so that, at least for some blades, the blade extends beyond the frame.

The device may have a mounting which allows the center of the blade to be moved relative to the frame. This aids in allowing a wider range of blade sizes to be used and, in preferred embodiments, still extend beyond the frame.

The separation of at least one of the wheels of the device may be varied relative to at least one of the other wheels. This may be by changing the mounting position of one or more wheels on the frame or by providing frame members which telescope. That is the length and/or width of the frame and/or the longitudinal and/or transverse separation of the wheels may be adjusted to accommodate the different sized blades.

Preferably, the mounting attaches to the boom of the brush cutter, but other mounting arrangements may be used.

Optionally, a second mounting attached to the frame remote from the first may be used to provide extra rigidity to the mounting of the cutter to the device. Preferably the primary mounting is adjustable to accommodate booms at different angles to the blade. This may be achieved by providing a pivoting clamp member.

In preferred forms of the invention, the frame is triangular with two straight sides and an outwardly curved rear side. The rear side is curved outwardly to accommodate the safety guard whilst allowing the blade to extend beyond the two straight sides. Use of a triangular shape allows the device to be compact but able to cut deeply into comers.

Preferably one of the wheels, most preferably the front wheel, can be mounted at a greater separation from the others. This allows a larger size blade to be used whilst retaining the small overall size.

The invention shall be better understood from the following description of a non-limiting embodiment and the drawings, in which.

Referring to FIGS. 1 to 4, the device comprises a wheeled frame 10. The frame 10 has two straight side members 12, 13 and a rear member 14 which are arranged in a horizontal plane. The rear and side members are sized so that their apexes are equidistant from each other, preferably 510 mm. The rear member is preferably curved, and on a constant radius of curvature of about 293 mm. However, the rear member 14 may be straight or of a different shape. If desired, the member 14 may extend out of the horizontal plane of the apexes.

Supporting the frame are three caster wheels 16, mounted to the frame at its apexes. The caster wheels are free to rotate about their respective apex and, as is normal with caster wheels, have horizontal axes offset from the vertical axis of rotation. In the preferred embodiment the wheels are offset by 35 mm and the wheel extends a maximum of 85 mm from the vertical axis.

Extending upwardly and inwardly from each apex are three support arms, 17, 18 and 19 for supporting the mounting 20 of the brush cutter. As is apparent from FIGS. 1 and 2, each arm extends in a vertical plane but, mainly for aesthetic reasons, is curved when viewed from the side. If desired, straight arms may be utilized.

The mounting 20 for the brush cutter comprises three main parts, a sleeve 21, rigidly attached to the three arms, a slider 23 which is received in the sleeve 21 and which may slide lengthways along the sleeve, and a pivoting clamp 25, which is pivotably mounted on the slider 23 and which is adapted to clamp around the boom of the brush cutter.

The sleeve 21 is comprised of a short piece of rectangular hollow section tubing, about 100 m long and 20 mm wide and 45 mm deep. The sleeve is attached to the front support arm 18 at its front and to the two side support arms 17 and 19 at its sides adjacent its rear. A slot 26 extends along the top surface from the rear towards the front but stops short so as to be blind. It will be appreciated that a deep C section may be used for the sleeve instead of the tubing.

The slider 23 comprises a flat plate sized to snugly fit within the sleeve but to be slidable. The slider has a bolt 28 located at its front end and extending outwards. The bolt 28 and slot 26 are sized so the bolt may extend out of the slot. A nut 29 and washer 30 are mounted on the bolt 28 and may be tightened against the sleeve to secure the slider in a selected position in the sleeve. The bolt 28 may be a conventional bolt passing through the plate, with its head located in a recess. Alternatively the "bolt" may be a threaded rod secured in a blind hole in the plate.

The slider 23 is of sufficient length (about 140 mm) that when fully inserted into the sleeve 21, its rear portion extends rearwardly of the sleeve 21. The rear portion has a first horizontal bore 32 extending from side to side and an arcuate slot 34 extending through the plate, rearwardly of the bore 32 and centered on the bore 32, preferably on a 20 mm radius. When used with straight boomed brush cutters, the slider 23 needs to be about 300 mm long.

The clamp 25 consists of two clamp plates 35, 36 which are firmly attached on either side of the slider 23. The two plates are provided with three bores 38, 39 and 40. Bores 38 and 39 align with the bore 32 and arcuate slot 34 in the slider. Bolts (not shown) pass through bores 32 and 38 and bore 39 and slot 34 so that the clamp may pivot about bore 32 and be held by the bolt passing through slot 34. The opposing faces of the two plates 35, 36 are also provided with channels 41, 42, which define a bore 43 sized to receive the boom of the brush cutter. The bore 43 is preferably 26 mm in diameter, but may be of other sizes. A third bolt passes through bores 40 and enables the clamp 25 to be clamped to the bore of the brush cutter. Thus by adjusting the position of the slider 23 relative to the sleeve 21 and the angle of the clamp 25 to the slider 23, it is possible to position the brush cutter so that its blade is parallel to the ground and clears the wheels. It will be appreciated that the angle of the boom to the blade at the point of clamping varies between models, as does the diameter of the blade.

It will be appreciated that the wheels limit the maximum size of the blade that may be used. With the configuration described, the maximum blade radius is 200 mm, at which size the blade just clears all three wheels at all times. To enable larger size blades to be used, the device has an optional extender 50 which is to enable the front caster 16a to be moved forward relative to the frame and the two rear casters 16b, 16c. This allows the centre of the blade to be moved forward so as to clear the two rear wheels without hitting the front wheel.

Figure 1:
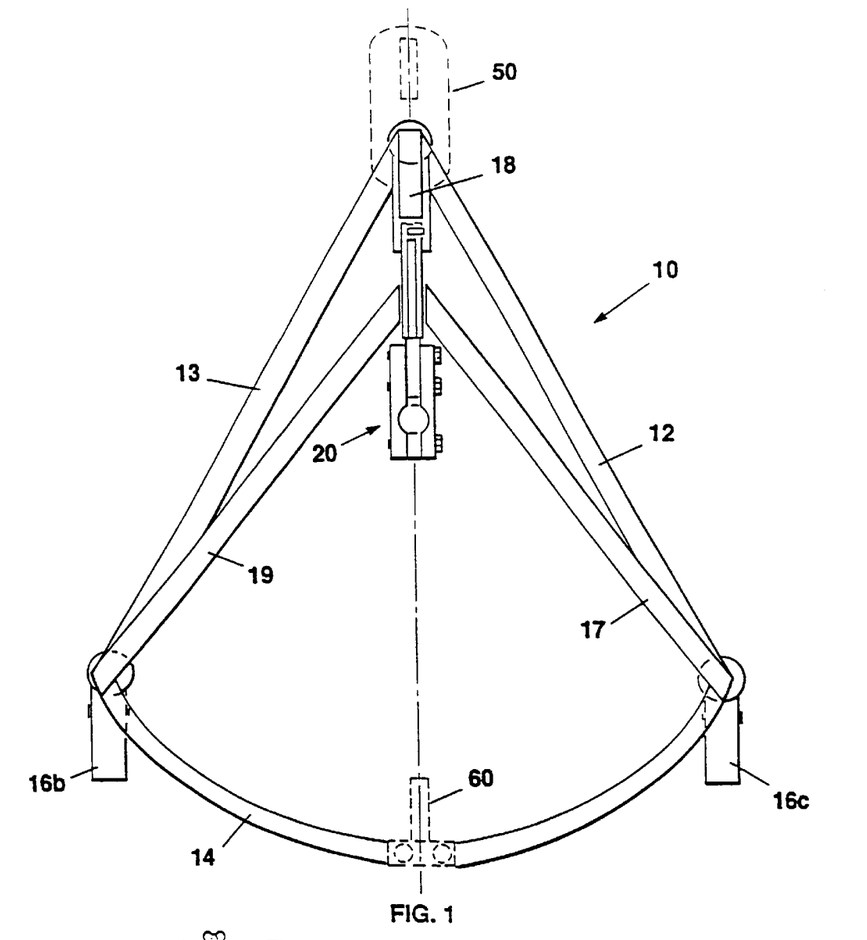
FIG. 1 is a plan view of an embodiment of the invention.
Figure 2:
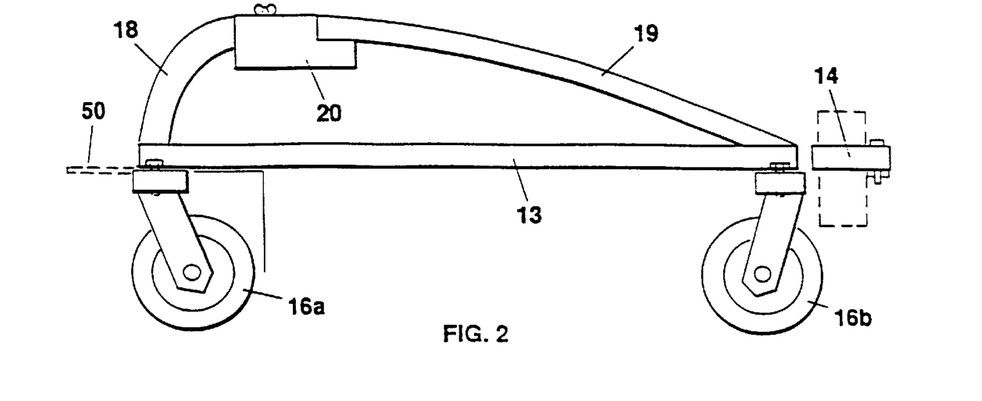
FIG. 2 is a side view of the embodiment of FIG. 1.
Figure 3:
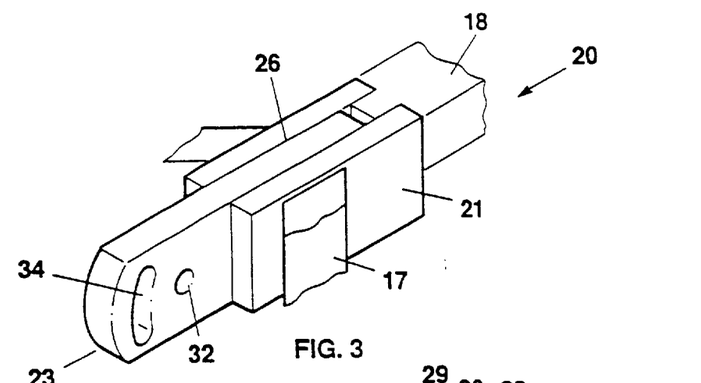
FIG. 3 is a detail view in perspective of part of the mounting for the brush cutter.
Figure 4:
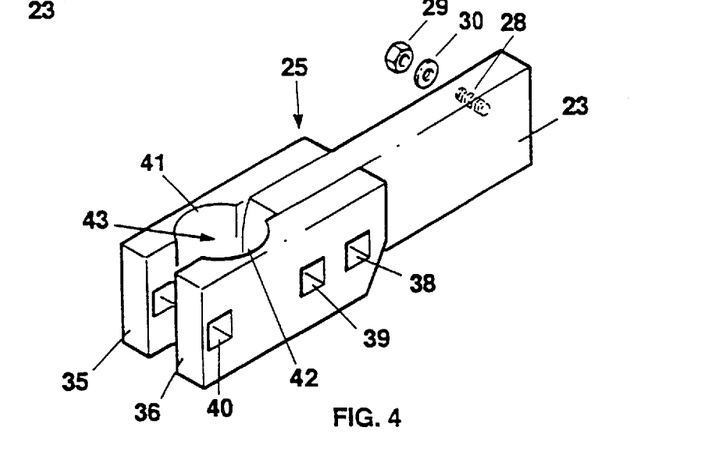
FIG. 4 is a detail view in perspective of the remainder of the mounting for the brush cutter.
Figure 5:
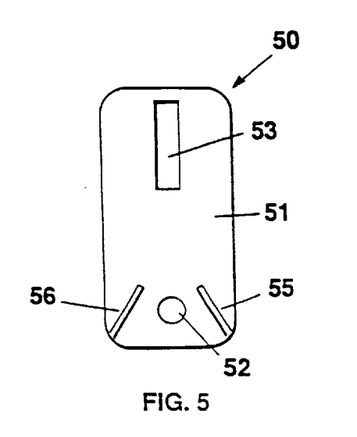
FIG. 5 is a view of an optional wheel mounting.

The front caster 16a is attached to the frame by a bolt or similar fixing and to move the caster it is removed, the extender 50 is attached to the frame and the caster is attached to the extender. Referring to FIG. 5, the extender comprises a rectangular flat plate 51 having a first bore 52 passing therethrough at one end. An elongate slot 53 is provided at the other end, extending lengthways. In use the plate is attached to the frame using a bolt passing through the rear bore 52 and the bore in the frame normally used to secure the caster 16a. The caster 16 is attached to the extender 50 by a bolt or similar fixing passing through the slot 53. This enables the position of the caster 16a to be varied. To provide the plate 50 with extra rigidity and to prevent it pivoting about the rear fixing point, two webs 55, 56 are provided on one side. The webs 55, 56 extend perpendicularly to the plate and at an angle to each other. They are positioned so as to bear against the vertical outside faces of the two side members 12, 13.

Figure 7:
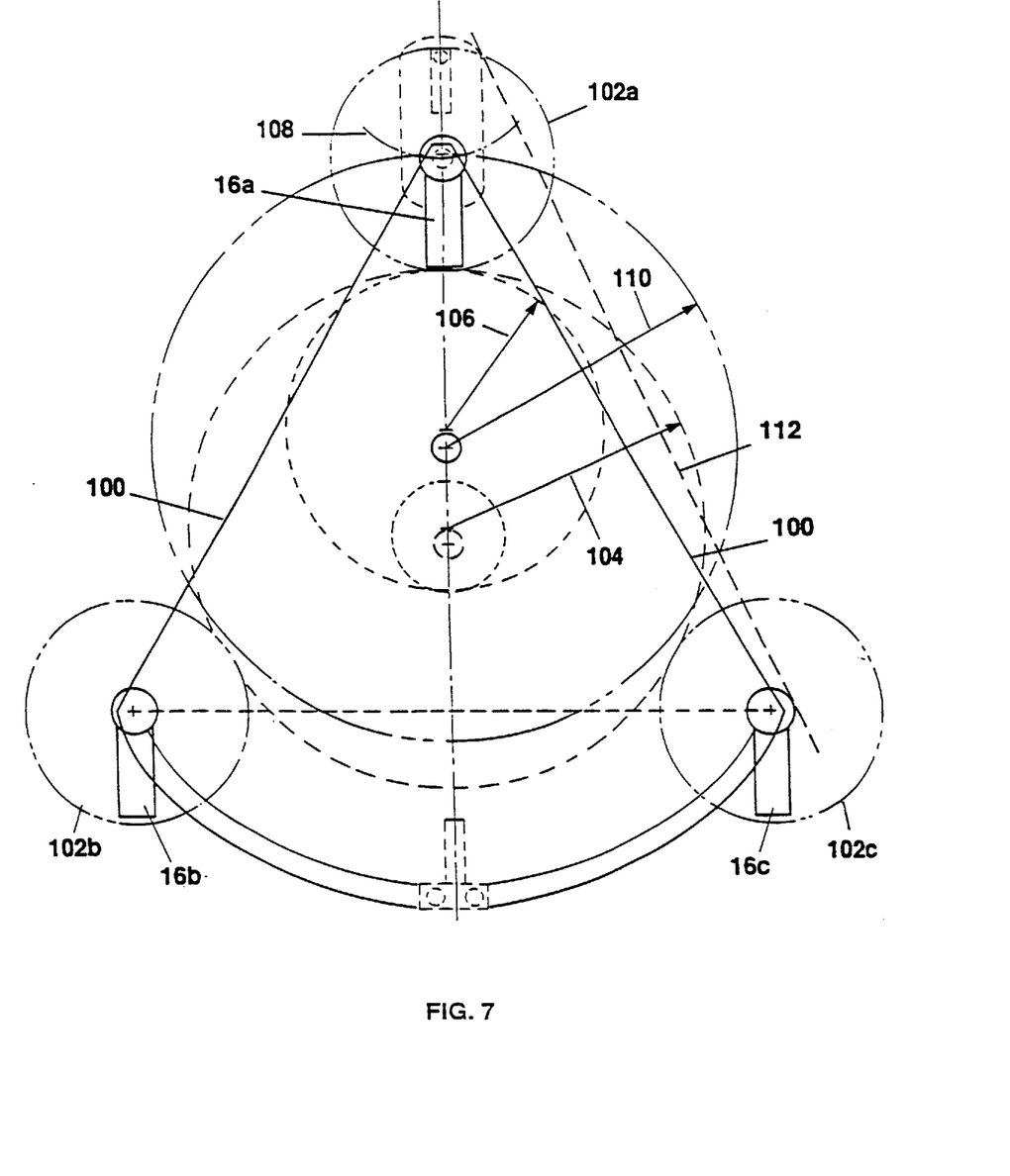
FIG. 7 is a schematic plan view showing the cutting areas possible with the device.

Referring to FIG. 7, there is shown a diagram of the device in various configurations. Lines 100 represent the outer faces of the two side members 12, 13 and so represent a limit on how close the device may be taken to an object such as a wall or fence. Circles 102 represent the area in which the wheels 16 may be positioned and so are areas into which the blade may not extend.

Radius 104, which is 200 mm represents the largest radius blade that may be used with the casters in the standard position. This just clears circles 102 whilst extending beyond lines 100. In this embodiment, a 200 mm blade extends by 45 mm beyond lines 100. Thus the device can still be used to cut grass or weeds growing against a wall or such like.

With smaller diameter blades, it is still possible to provide this edging function while mounted on the device, by moving the centre of the blade towards the front caster 16a. This is achieved by sliding slider 23 forward in sleeve 21. Radius 106 represents a blade 250 mm in diameter which has been moved forward until it still just clears front caster 16a. It will be noted that radius 106 extends beyond lines 100, so as to still provide an edge cutting ability.

FIG. 7 also diagrammatically shows the device with the front caster 16a mounted on the optional extender 50. Line 108 represents the boundary of the wheel area. Radius 110 represents a blade having a 230 mm radius and, as is apparent, by moving the center point of the blade forward, such a radius blade still clears the two rear wheel areas 102b, c while not encroaching on the front wheel area represented by line 108.

When the front caster 16a is moved to the forward position, the limit to which it can be placed against a wall is represented by line 112. Line 112 is drawn from the outermost point of the rear caster 16b or 16c to the outermost point of the extender 50. A 230 mm blade extends about 75 mm beyond this line. It will be noted that a 200 mm radius blade will also extend beyond this line.

Figure 6:
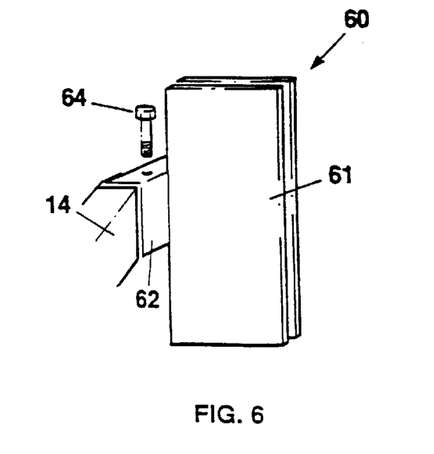
FIG. 6 is a detail view of an optional second mounting for the device.

In normal use, with relatively lightweight electrically powered brush cutters, the central mounting 20 is sufficient. However, with heavier devices, particularly internal combustion engined devices, a second mounting point is desirable to provide extra rigidity in the mounting. Accordingly, an optional mounting 60 is provided for attachment to the rear frame rail 14. This is shown in FIG. 6. The optional mounting comprises a sleeve 61 similar to the sleeve 21, but provided with an angle 62 to enable it to be mounted to the rear frame rail 14 by way of a bolt 64. A suitable clamp and slider, not shown, but similar to the clamp 25 and slider 23 of mounting 20 are mounted on the sleeve and attached to the boom guard of the brush cutter below the primary clamp. For this secondary mounting, the slider needs to be about 140 mm long.

Figure 8:
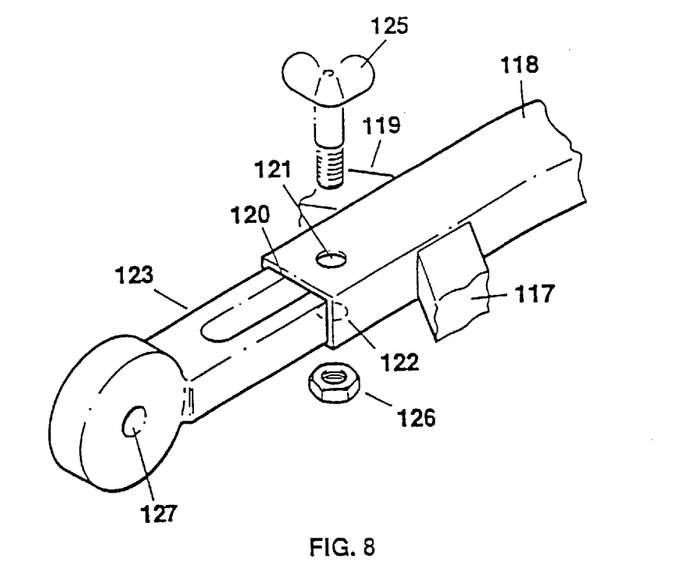
FIG. 8 shows a detail view in perspective of part of a first alternative mounting arrangement.
Figure 9:
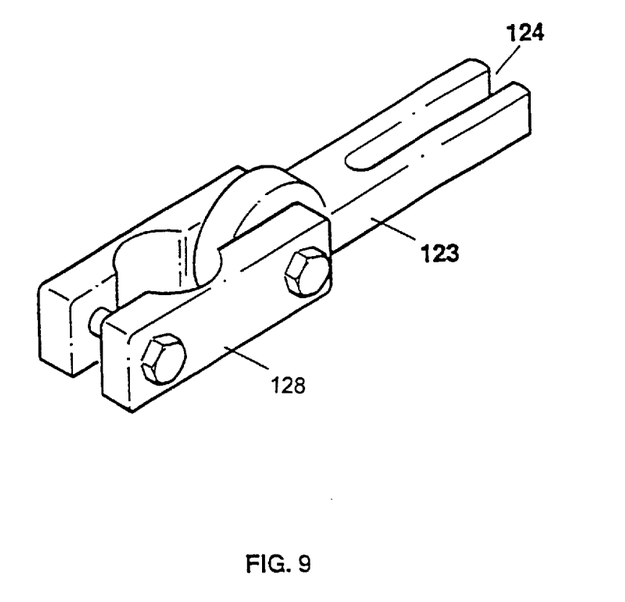
FIG. 9 shows a perspective view of part of the mounting arrangement of FIG. 8.
Figure 10:
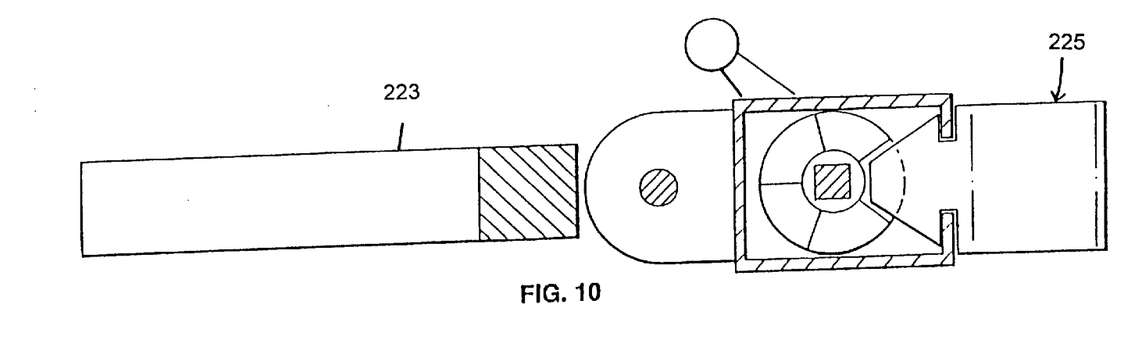
FIG. 10 is a cross-sectional view from the side of a second alternative mounting arrangement.
Figure 11:
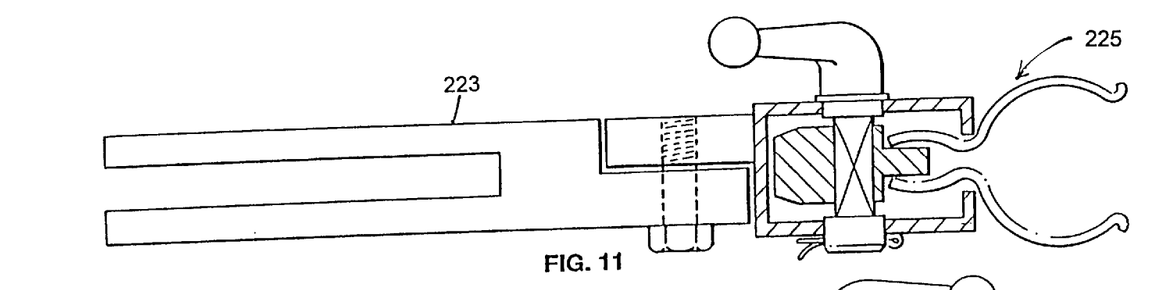
FIG. 11 is a cross-sectional view from above of the arrangement of FIG. 10 when in first configuration.
Figure 12:
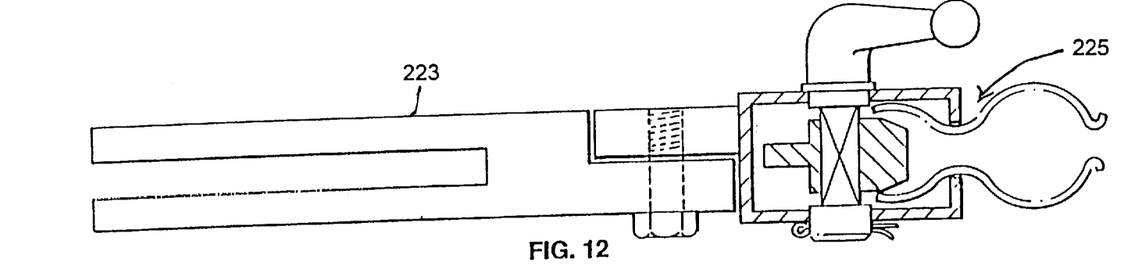
FIG. 12 is a cross-sectional view from above of the arrangement of FIG. 10 when in a second configuration.
Figure 13:
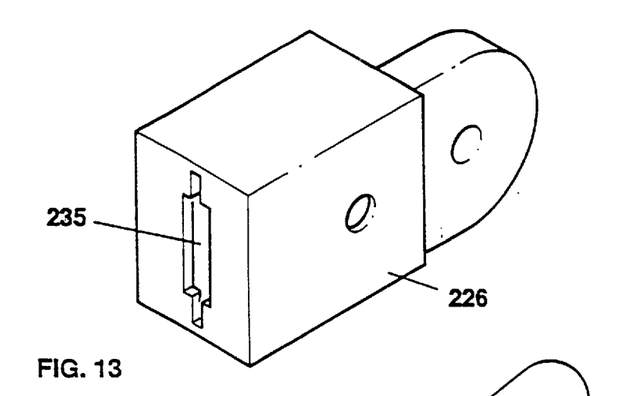
FIGS. 13–16 show perspective views of various components of the second mounting arrangement.
Figure 14:
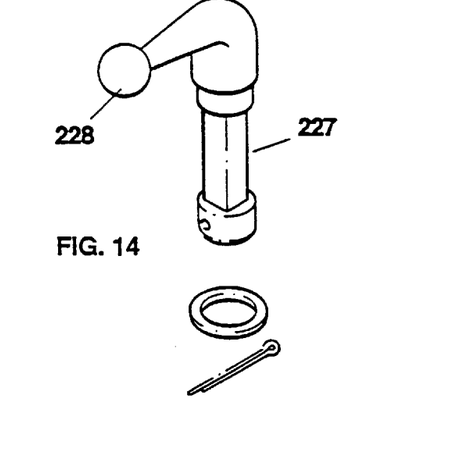
Figure 15:
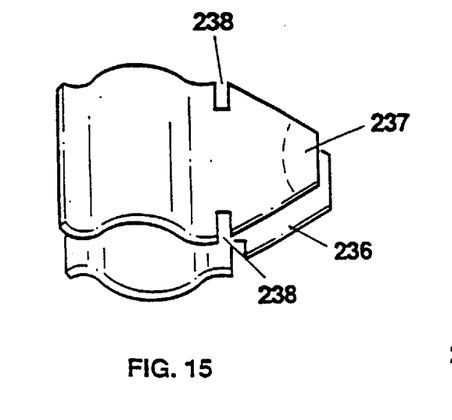
Figure 16:
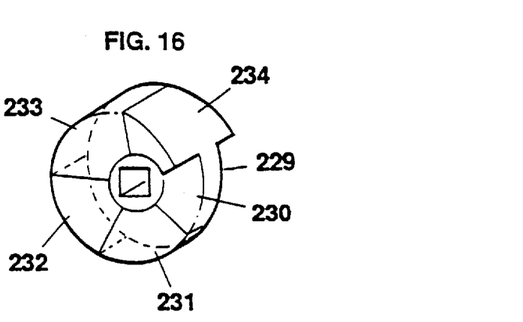

Referring to FIGS. 8 and 9, there is shown a first variation of the mounting mechanism of the device.

Compared to the first embodiment, the support arm 118 connects directly with side arms 117 and 119 and extends rearwardly a short distance. The free end 120 of the arm 118 is hollow, preferably of rectangular section. A hole 121 is provided adjacent the free end 120. Although not visible in the drawings, there is a hole 122 in the center of the lower wall of the arm 118 directly below hole 121.

A slider 123 is snugly received in the arm 118. The slider 123 has a slot 124 extending lengthways from one end. The slot 124 is smaller in width than hole 122 and is located so that a bolt 125 may pass through hole 121, slot 124 and hole 122. The hole 122 is sized so that a nut 126 on the bolt 125 may clear slot 122 and bear on slider 123. Thus when the bolt 125 is tightened, the slider 123 is held firmly in place.

The slider 123 has a single mounting hole 127 for the clamp 128 but otherwise operates as per the first embodiment. It will be appreciated that an over centre clamping arrangement may be used instead of the nut and bolt arrangement, so as to allow for quick release/mounting.

Figure 17:
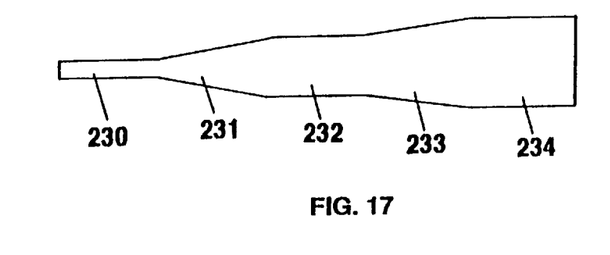
FIG. 17 shows an "unrolled" view of the circumferential surface of the cam shown in FIG. 16.

Referring to FIGS. 10 to 17, there is shown an alternate clamping arrangement to that of the first embodiment The clamp 225 is pivotably mounted on a modified slider 223, similar to that of FIGS. 8 and 9 and comprises a housing 226, in which a shaft 227 is rotatably mounted. The shaft may be rotated by way of integral handle 228. The shaft 227 has a central section of square profile on which is mounted a cam 229. The cam 229 is cylindrical having its ends cut away so that its width varies. The circumference may be divided into five equal segments 230, 231, 232, 233 and 234. The width and relationship of segments is best seen in FIG. 17, which shows an "unrolled" view of the circumferential surface of the cam 229. The width of the various segments are as below.

segment 230 constant 3 mm width segment 231 increases from 3 mm to 12 mm width segment 232 constant 12 mm width segment 233 increases from 12 mm to 15 mm width segment 234 constant 15 mm width The forward end of the housing 226 has an opening 235 through which two identical spring clamp elements 236, 237 pass. The elements 236, 237 are provided with slots 238 on their upper and lower edges which enable the elements 236, 237 to be pivotably mounted on the wall of the housing. The opening 235 has its center of greater height to enable the elements to be inserted and mounted on the housing wall.

The inner ends of the elements 236, 237 are positioned on either side of the cam 229 and bear on the side surfaces 230–235 of the cam, depending on its rotational position. When the elements 236, 237 contact the segment 230, their free ends are fully open and enable a brush cutter boom to be engaged or disengaged from the elements. With a 22 mm diameter boom, the handle 228 is rotated to bring the segment 234 to bear on the elements 236, 237. This applies sufficient compressive force against the boom to maintain it in position. With a 25 mm diameter boom, the inner ends of the elements do not need to be separated as much, and so it is only necessary for segment 232 to bear on them. It will be appreciated that other sizes of boom may be accommodated by varying the configuration of the cam 229.

Figure 18:
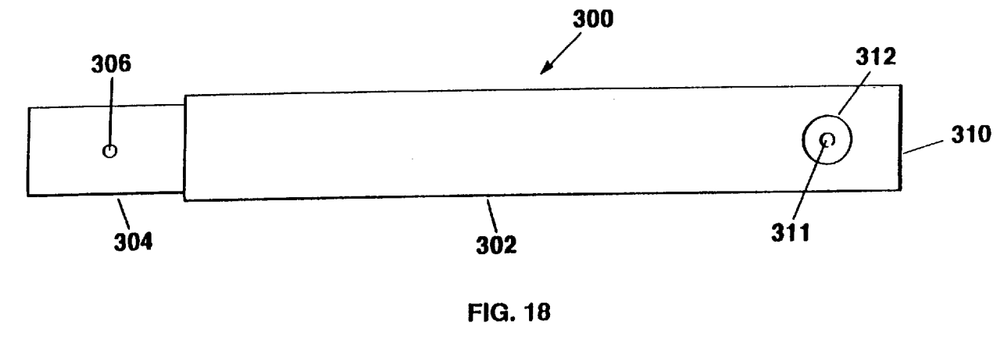
FIG. 18 is a side view of an extension arm for use with straight boomed brush cutters.

Referring to FIG. 18, there is shown an extender for the mounting shown in FIG. 8 to enable straight boomed brush cutters to be used with the device. The boom of straight boomed brush cutters need to be mounted further towards the rear to center the blade. Accordingly an extension arm 300 is provided. This arm 300 comprises a section 302 of box section about 200 mm long and of the same internal dimensions as the arm 118. Thus the slider 123 may slide into the rearward end 310. Adjacent this end 310 there is a hole 311 through the upper surface of section 302 and a larger hole 312 in the lower surface. This allows a second lock bolt, not shown, to secure the slider in the section 302 At the forward end of the section 302, there is an extension 304 adapted to slide into to arm 118. As with the slider 123, there is provided a bore hole 306 through which the lock blot 125 may pass, and thereby secure the extension piece 300 in the arm 118.

While the invention has been described with reference to a three wheeled device having a fixed size frame, it will be appreciated that the invention is not limited to either feature. For instance, the invention includes within its scope a square or rectangular frame with four wheels. Such a frame may also be provided with telescoping/pivoting frame members such that the length and width of the device may be adjusted according to the size of the brush cutter being used. It will further be appreciated that such a square or rectangular frame still allows the blade of the cutter to extend beyond at least some of the frame.

While the invention has been described with reference to use with a brush cutter, it will be appreciated that it may be used with other normally hand held devices, such as high pressure water sprayers, hand held leaf blowers or vacuum devices or similar devices.

It will be apparent to those skilled in the art that many modifications and variations may be made to the embodiment described herein without departing from the spirit or scope of the invention.

I claim:

1. An attachment for use with a brush cutter having a blade rotatable about a blade center, the attachment comprising:

a frame having a front end and a rear end;

three wheels mounted on the frame to support the frame for movement over the ground, the wheels comprising a front wheel mounted at the front end and two spaced apart rear wheels mounted at the rear end;

an adjustable boom mounting means for attaching a brush cutter to the frame, the boom mounting means adapted to firmly locate the center of the blade within an area bounded by the wheels;

the frame including two side members each side member extending generally parallel to a line joining the front wheel to the respective rear wheel so as to allow a blade of sufficient to the extend sideways of the frame while clearing the wheels;

wherein the boom mounting means is adapted to be secured in one of a plurality of positions to position the center of the blade forwards or rearwards relative to the frame.

2. The attachment of claim 1 including front wheel mounting means adapted to secure the front wheel at one of a plurality of locations forwards or rearwards relative to the frame.

3. The attachment of claim 1 including separation means for varying the distance of at least one of the wheels from at least one of the other wheels.

4. The attachment of claim 1 including wheel mounting means for mounting at least one of the wheels on said frame, said wheel mounting means adapted to mount said at least one wheel at one of a plurality of positions.

5. The attachment of claim 1 wherein the frame is comprised of frame members.

6. The attachment of claim 1 wherein the boom mounting means includes boom angle compensation means, said boom angle compensation means adapted to be secured at one of a plurality of positions for compensating for different brush cutters having different angles of boom at a point of mounting.

7. The attachment of claim 1 wherein the frame is three sided and the blade extends on first and second sides of the frame.

8. The attachment of claim 7 wherein the first and second sides of the frame are straight and including a third side which is curved outwardly.

9. The attachment of claim 7 wherein the frame has the three corners and has three wheels mounted at the corners of the frame.

* * * * *